United States Patent
Herbeck

(10) Patent No.: US 9,563,586 B2
(45) Date of Patent: Feb. 7, 2017

(54) SHIMS FOR PROCESSOR INTERFACE

(71) Applicant: Apple Inc., Cupertino, CA (US)

(72) Inventor: Gilbert H. Herbeck, Livermore, CA (US)

(73) Assignee: Apple Inc., Cupertino, CA (US)

( * ) Notice: Subject to any disclaimer, the term of this patent is extended or adjusted under 35 U.S.C. 154(b) by 392 days.

(21) Appl. No.: 13/861,136

(22) Filed: Apr. 11, 2013

(65) Prior Publication Data

US 2014/0310443 A1  Oct. 16, 2014

(51) Int. Cl.
G06F 13/36 (2006.01)
G06F 13/28 (2006.01)

(52) U.S. Cl.
CPC ............. *G06F 13/28* (2013.01); *G06F 13/36* (2013.01)

(58) Field of Classification Search
USPC ..... 710/22, 27, 52, 300, 105, 113, 305, 306, 710/307, 308, 309, 310, 313, 315
See application file for complete search history.

(56) References Cited

U.S. PATENT DOCUMENTS

| | | | | |
|---|---|---|---|---|
| 5,896,540 A | * | 4/1999 | Asano et al. | 710/260 |
| 5,961,614 A | * | 10/1999 | Christiansen | 710/22 |
| 6,601,126 B1 | * | 7/2003 | Zaidi et al. | 710/305 |
| 6,615,292 B1 | * | 9/2003 | Sota | 710/22 |
| 6,658,519 B1 | * | 12/2003 | Broberg et al. | 710/311 |
| 6,823,403 B2 | * | 11/2004 | Gulick et al. | 710/22 |
| 6,829,669 B2 | * | 12/2004 | Jahnke et al. | 710/306 |
| 7,376,777 B2 | * | 5/2008 | Coffee et al. | 710/306 |
| 7,552,241 B2 | | 6/2009 | Ramey | |
| 7,587,525 B2 | | 9/2009 | Dahan et al. | |
| 7,774,513 B2 | | 8/2010 | Haneda et al. | |
| 8,028,116 B2 | * | 9/2011 | Kawaguchi | 710/305 |
| 2002/0174252 A1 | * | 11/2002 | Hayter et al. | 709/250 |
| 2003/0046458 A1 | * | 3/2003 | Morishima | 710/22 |
| 2003/0200373 A1 | * | 10/2003 | Kent | 710/305 |
| 2003/0217218 A1 | * | 11/2003 | Gaidukov | 710/307 |
| 2005/0240706 A1 | * | 10/2005 | Tsai | 710/306 |
| 2006/0047882 A1 | * | 3/2006 | Kawaguchi | 710/315 |
| 2010/0005199 A1 | * | 1/2010 | Gadgil | 710/22 |
| 2012/0011295 A1 | * | 1/2012 | Tsadik et al. | 710/308 |
| 2013/0042155 A1 | | 2/2013 | Millet et al. | |

* cited by examiner

*Primary Examiner* — Khanh Dang
(74) *Attorney, Agent, or Firm* — Meyertons, Hood, Kivlin, Kowert & Goetzel, P.C.; Erik A. Heter

(57) ABSTRACT

An interface unit configured to perform transfers between a processor and one or more peripheral devices is disclosed. A system includes a processor, a number of devices (e.g., peripheral devices), and an interface unit coupled therebetween. The interface unit includes FIFOs for storing data transmitted to or received from the devices by the processor. The interface unit may access data from a device responsive to a request from the processor. The data may be loaded into a FIFO according to transfer parameters controlled by the device. After the data has been received by the FIFO, the interface unit may generate an interrupt to the processor. Data may then be transferred from the interface unit to the processor according to transfer parameters controlled by the processor. The interface unit may thus homogenize a processor interface to a number of different devices.

17 Claims, 5 Drawing Sheets

SHIMS FOR PROCESSOR INTERFACE

BACKGROUND

Technical Field

This disclosure is directed to electronic systems, and more particularly, to interfacing devices in electronic systems.

Description of the Related Art

Operating speeds of processors used in computers and other devices has increased dramatically since the beginning of the personal computer revolution. Clock speeds of processors have increased from a few megahertz in the early 1980's to several gigahertz at present. Additionally, processors have added multiple processor cores to further increase performance. Further performance gains have been attained by the advent of the system on a chip (SoC), which integrates processors with other functions on a common integrated circuit die.

Peripheral and I/O devices have also undergone performance increases over the same period. However, in many cases the rate of performance increase has not kept pace with that of processors. This in turn can complicate communications between processors and such devices, and can in some cases produce system bottlenecks.

SUMMARY

An interface unit configured to perform transfers between a processor and one or more peripheral devices is disclosed. In one embodiment, a system includes a processor, a number of devices (e.g., peripheral devices), and an interface unit coupled therebetween. The interface unit includes first-in, first-out memories (FIFOs) for storing data transmitted to or received from the devices by the processor. During the transfer of data from a device to the processor, the interface unit may access the data from the device responsive to a request from the processor. The data may be loaded into a FIFO according to transfer parameters controlled by the device. After the data has been received by the FIFO, the interface unit may generate an interrupt to the processor. Data may then be transferred from the interface unit to the processor according to transfer parameters controlled by the processor.

In one embodiment, a method includes a processor requesting data from one of a number of devices (e.g., peripheral devices). The request may be received by an interface unit, which may then access the data from the target device. The requested data may then be transmitted from the target device to the interface unit, where it may be temporarily stored in a FIFO. The data may be transferred from the device to the interface unit according to transfer parameters (e.g., clock frequency, data width) of the device. After at least some of the data has been stored in the FIFO, the interface unit may generate an interrupt to the processor. Data may then be transferred to the processor, from the interface unit according to transfer parameters controlled by the processor.

The interface unit may thus homogenize a processor interface to a number of devices. That is, all data transferred directly to or received directly from the processor, by the interface unit, is transferred at parameters set by the processor, irrespective of the device with which data is exchanged. Similarly, data transferred directly to or received directly from a device, by the interface unit, may be transferred at the transfer parameters of the device.

BRIEF DESCRIPTION OF THE DRAWINGS

The following detailed description makes reference to the accompanying drawings, which are now briefly described.

Figure 1:
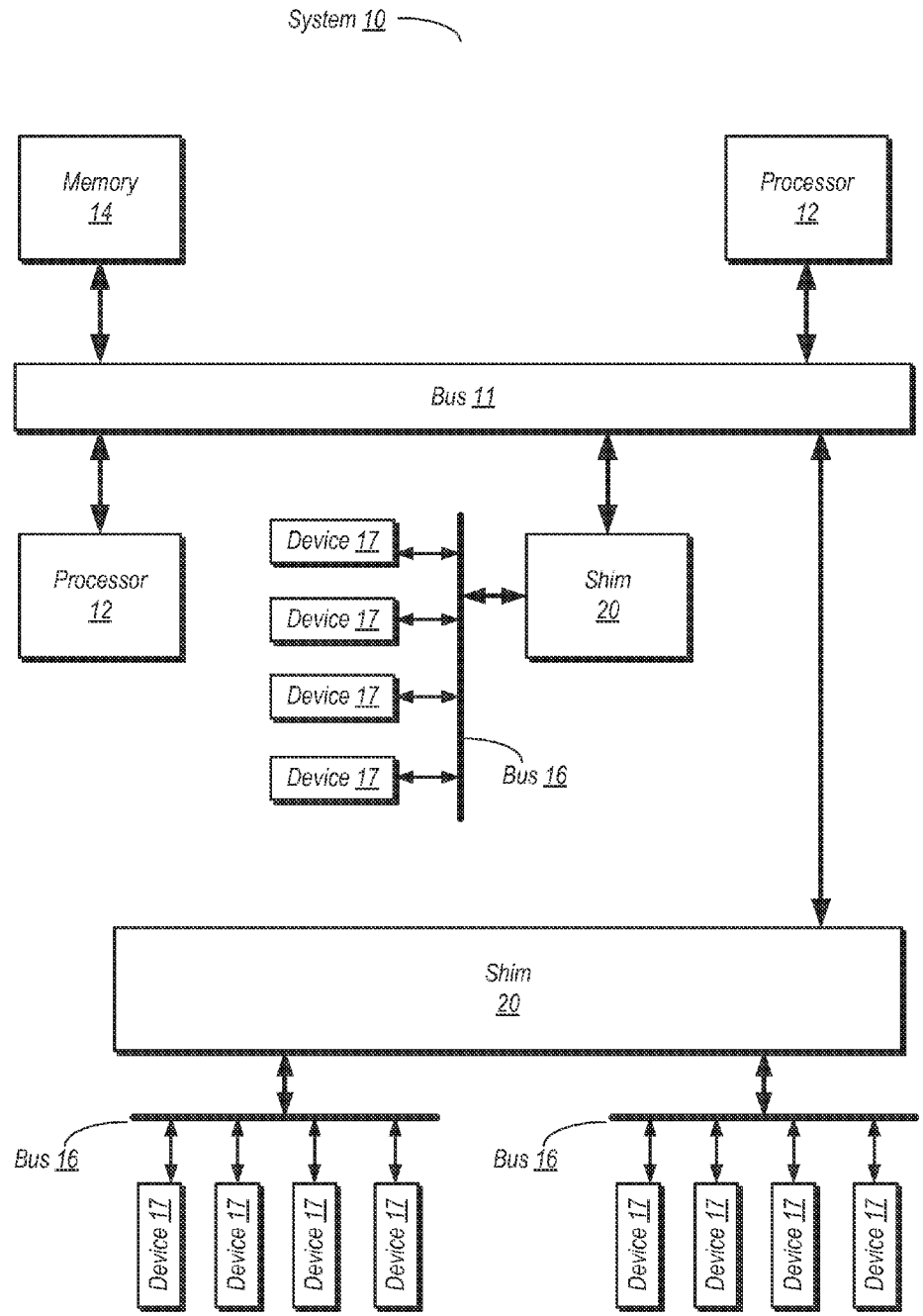
FIG. 1 is a block diagram of one embodiment of a system including a processor and a number of devices.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of a system is shown. In the embodiment shown, system 10 may be a computer system, a portable device (e.g., a smart phone or tablet computer) or any other device. At least some of the various components shown may be implemented on the same IC die, e.g., as part of a system on a chip (SoC), in various embodiments, although the disclosure is not limited to SoC embodiments. It is noted that the number and arrangement of the components shown here is exemplary and is thus not limiting to other embodiments that fall under the scope of this disclosure.

In the embodiment shown, system 10 includes a pair of processors 12 and a memory 14 coupled to a bus 11. Memory 14 may be a main system memory, and may be implemented using various memory technologies, such as one of a number of different types of dynamic random access memory (DRAM) technologies. Processors 12 may implement one of a number of different types of processor architectures, such as one of the various ARM architectures, the x86 architecture, or any other type of processor architecture. It is noted that it is not necessary that both of processors 12 shown here be implemented with the same architecture.

System 10 includes a number of different devices 17. Some of these devices may be implemented on the same IC die as other components, while others may be external to any IC die in which other components of system 10 are implemented. The devices 17 may be virtually any type of device. Such devices may include various peripheral devices (e.g., printers, network interfaces, etc.), various radio circuitry (e.g., cellular transceivers, wi-fi transceivers, etc.), graphics processors, and any other type of device. Devices 17 may include devices not explicitly or implicitly mentioned here.

Each of devices 17 is coupled to a bus 16. The various buses 16 may be different from one another. Bus types that may be used to implement the buses 16 may include a universal serial bus (USB), peripheral component interconnect (PCI) bus, a PCI extended (PCI-X) bus, industry standard architecture (ISA) bus, any of the various ARM AMBA (Advanced Microcontroller Bus Architecture) buses such as AXI (Advance Extensible Interface), AHB (Advanced High Performance Bus), or APB (Advanced Peripheral Bus), any of several types of on-chip buses, or any other type of bus.

System 10 includes a plurality of shims 20. Each shim 20 may function as an interface unit to provide an interface between processors 12 and the various devices 17. Each shim 20 may also provide an interface between memory 14 and the various devices 17. Moreover, each shim 20 may provide a homogenized interface to each of devices 17 for processors 12 and memory 14. For example, data transferred between a processor 12 and a shim 20 may be transferred according to data transfer parameters (e.g., clock frequency, data width, etc.) controlled by the processor, irrespective of the transfer parameters of the device 17 at the other end of the exchange. This is in contrast to a simple bus bridge, which primarily converts or translates transactions from one bus to another bus. For example, a processor 12 may be configured to transfer eight 32-bit words in a single transaction, where as a device 17 may be configured to transfer only a single 8-bit byte in a transaction. Through a conventional bus bridge, the processor 12 may be unable to perform such a transaction with the device 17, the former thus being limited by the latter. However, using the shims 20, the exemplary processor 12 discussed herein may transfer up to eight 32-bit words each transaction irrespective of the limitations of device 17.

In order to transfer data from a device 17 to a processor 12, the latter may assert a request for data from the former. Alternatively, the device 17 may assert an interrupt indicating that it needs to send data to the processor 12. The shim 20 coupled between the processor 12 ('the target processor') and the device 17 ('the target device') may then access the data from the target device and store it therein. After receiving at least some of the data to be transferred, the shim 20 may generate an interrupt to the target processor. The target processor may then acknowledge the interrupt and respond thereto by accessing the data, according to processor data transfer parameters, from the shim 20.

Data may be transferred from the target processor to a target device responsive to a request from the device (e.g., via an interrupt) or may be initiated by the target processor. The target processor may transfer the data to the intervening shim 20 using transfer parameters controlled by the processor. The data may be temporarily stored within shim 20. When the target device is ready to receive the data, the data may be transferred by shim 20, using transfer parameters controlled by the device.

Figure 2:
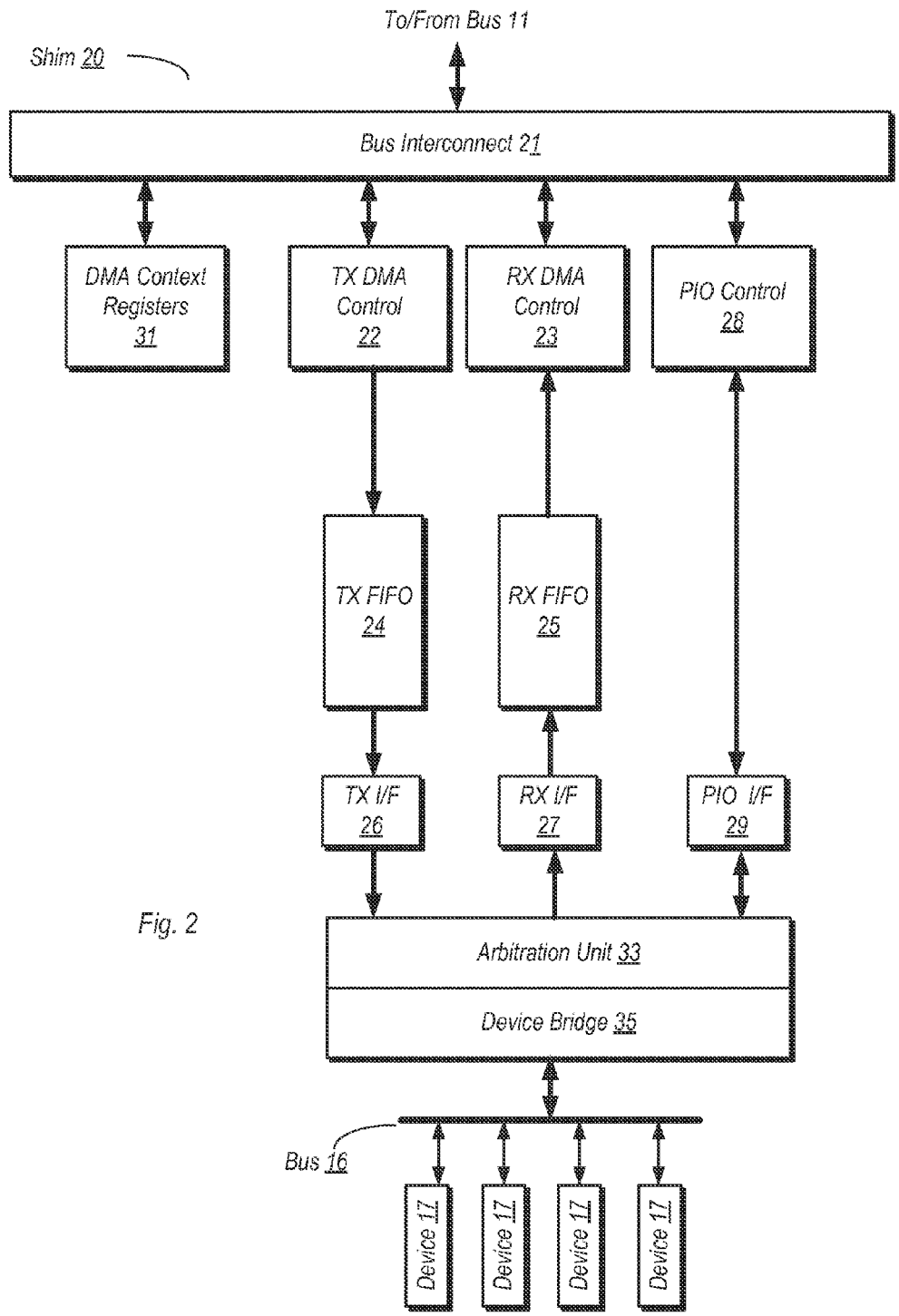
FIG. 2 is a block diagram of one embodiment of an interface unit coupled between a processor and a number of devices.

FIG. 2 is a block diagram of one embodiment of an interface unit coupled between a processor and a number of devices. In the embodiment shown, shim 20 includes a bus interconnect 21 coupled to bus 11 (which is in turn coupled to one or more processors 12 and a memory 14). Shim 20 also includes a device bridge 35 coupled to bus 16, which in turn is coupled to a number of devices 17. Between bus interconnect 21 and device bridge 35 are a direct memory access (DMA) transmit path (i.e. transmit from the processor to a device), a DMA receive path (i.e. the processor receives data from a device), and a bi-directional programmed I/O (PIO) path. An arbitration unit 33 is also included in each of these paths.

The transmit path includes transmit DMA 22, transmit FIFO 24, and transmit interface 26, the latter of which is coupled to arbitration unit 33. When transmitting data from a processor 12 (or memory 14) to a target device 17 through shim 20, transmit DMA controller 22 may receive the data from the processor and store it into transmit FIFO 24. Transmit interface 26 may access the oldest data stored in transmit FIFO 24 and provide it to arbitration unit 33. Once a transaction in the transmit path wins an arbitration in arbitration unit 33, it may be forwarded to device bridge 35 and thus to the target device 17 via bus 16.

The receive path includes receive DMA controller 23, receive FIFO 25, and receive interface 27. When a transaction destined for a processor 12 wins an arbitration in arbitration unit 33, receive interface 27 may receive the corresponding data and store it into receive FIFO 25. When there is enough data in the receive FIFO 25, based on parameters previously established, the receive DMA controller 23 may generate an interrupt that is sent to the target processor. When the target processor acknowledges that it is ready to service the interrupt, receive DMA controller 23 may access the transaction data from receive FIFO 25 and convey it, via bus interconnect 21, to bus 11 and thus to the target processor.

It is noted that in some embodiments, some or all of the functions provided by transmit DMA controller 22 and receive DMA controller 23 may be implemented using software. This software may manage bulk-level transfers of data between a processor 12 and shim 20, as well as managing bulk-level transfers of data between shim 20 and memory 14. By implementing at least some of the DMA functionality in software, post-silicon revisions to the DMA controllers are possible, and thus at least some aspects of the DMA control are not fixed.

In the embodiment shown, shim 20 includes DMA context registers 31. These registers may store various information for transactions conducted through the DMA transmit and DMA receive paths. For example, one or more DMA context registers may store data indicating a trigger level indicative of an amount of data to be stored in the receive FIFO before triggering an interrupt to the processor. During a transaction conducted through the receive DMA path, receive DMA controller 23 may access the DMA context registers to determine the trigger level and may accordingly assert an interrupt to the target processor when the trigger level has been received in receive FIFO 25. The DMA context registers may also store other information, such as data transfer parameters for a device involved in a transaction, identification information for transactions pending in shim 20, and so on. The information stored in DMA context registers 31 may be updated as older transactions are completed and new ones are initiated.

The transmit and receive FIFO's may store data for multiple transactions, for a single transaction, or for partial transactions. The amount of data stored in a FIFO may depend both on the size of the FIFO as well as certain parameters of the transaction (e.g., data width, transfer size, etc.). As data is written into receive FIFO 25, it may be re-packaged into a processor-friendly format. That is, the data is re-formatted such that it may be transferred to a target processor 12 using transfer parameters determined by the processor. For data that is to be transferred to memory 14, the data may be re-formatted such that it may be transferred to memory 14 using transfer parameters determined thereby. In some embodiments, the transfer parameters for transferring data to/from memory 14 and a processor 12 may be the same. Data written into transmit FIFO 24 may be re-packaged into a device-friendly format for the target device 17.

The PIO path as noted above is bi-directional, and may operate according to PIO principles. Data may be transmitted to a PIO device from a processor through PIO controller 28 and PIO interface 29. Data for the PIO transaction may then be conveyed to a target device when the transaction wins arbitration in arbitration unit 33. When a PIO transaction targeted for a processor 12 wins an arbitration in arbitration unit 33, it may be conveyed through PIO interface 29 and PIO controller 28, through bus interconnect 21, to the target processor via bus 11. It is noted that, similar to the DMA controllers discussed above, PIO controller 28 may be implemented at least in part using software, and thus may be enabled for post-silicon revisions.

Arbitration unit 33 may arbitrate between transactions competing for access to bus 16. The transactions arbitrated in arbitration unit 33 may include transmit transactions from the transmit DMA path and the PIO path, and receive transactions to be conveyed through the receive DMA path or the PIO path. Any suitable arbitration scheme may be used. Examples of possible arbitration schemes include least recently granted, round-robin, credit based schemes, priority based schemes, and so forth.

As noted above, shim 20 performs data transfers between itself and a processor 12 using data transfer parameters controlled by the processor. Similarly, data transfers between shim 20 and a device 17 may be conducted according to data transfer parameters of the device. The data transfer parameters may include a data width, a clock frequency, transfer size (including whether the transfer size is variable length or fixed), burst or single transfers, and so on. For the processor, the presence of shim 20 may effectively homogenize the interface, irrespective of the device 17 with which communications are being conducted. This may allow for more efficient communications than with a conventional bus bridge. For example, a processor may be able to transfer eight 32-bit words in a single transaction, while a device with which it is communicating is limited to one 8-bit byte per transaction. If communicating through a conventional bus bridge, the processor would be unable to access the data according to its transfer capability. Some bridges might attempt to support the transaction by breaking it into a number of smaller transactions, which can be very inefficient. In contrast, shim 20 may levelize all transactions such that a processor may operate according to its own transfer parameters during communications therebetween. Only communications between a device 17 and shim 20 may be limited by the capability of the former. This may also allow more efficient communications on bus 11, as the presence of shim 20 may allow all communications thereon to be conducted in accordance with the capabilities of the processor(s) 12 and memory 14, rather than being limited by the capabilities of a device 17 which is communicating with one of the former.

Figure 3:
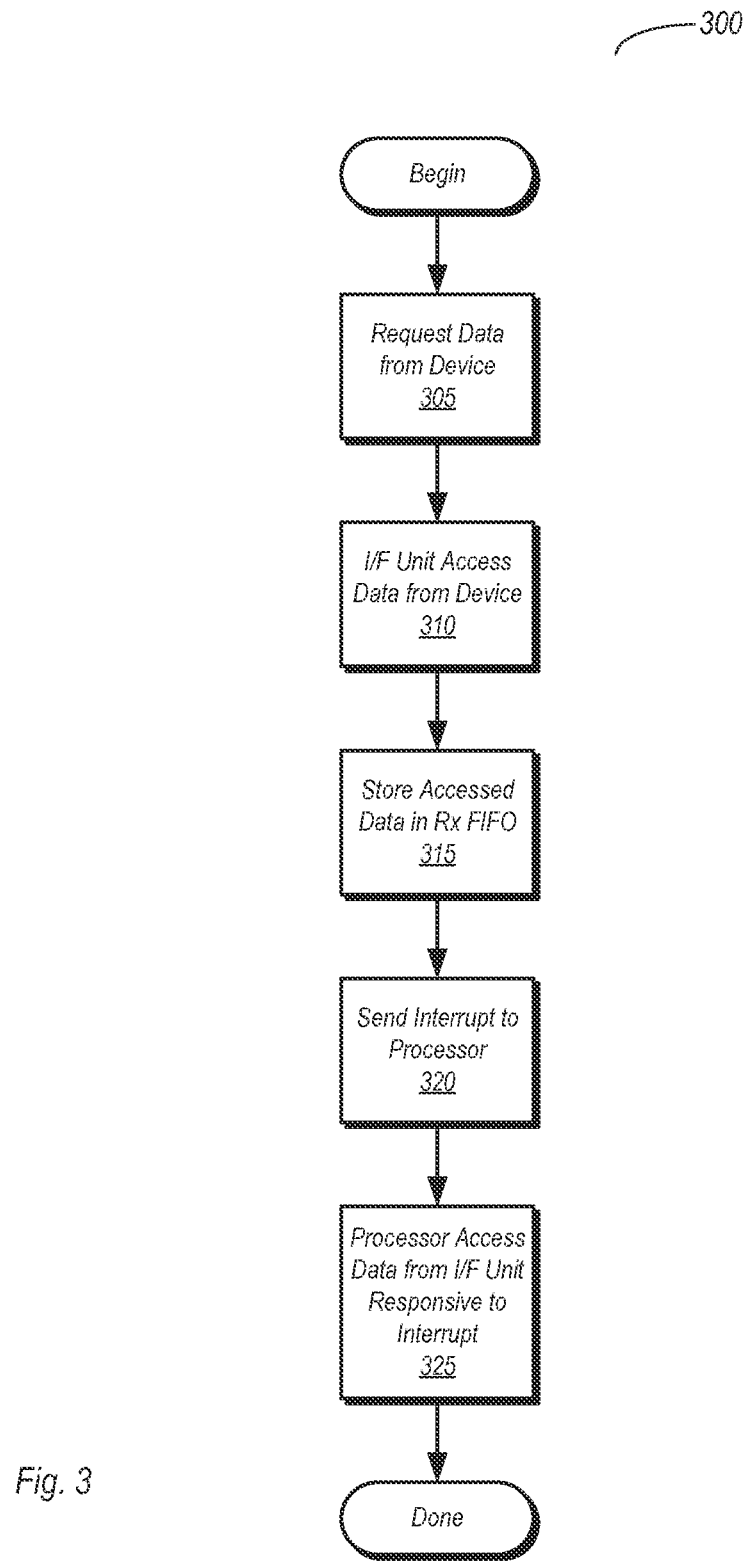
FIG. 3 is a flow diagram illustrating one embodiment of a method for transferring data from a device to a processor via an interface unit.

FIG. 3 is a flow diagram illustrating one embodiment of a method for transferring data from a device to a processor via an interface unit. Method 300 may be performed using various embodiments of the system 10 and/or shims 20 as described above. Method 300 may also be performed using hardware embodiment not explicitly discussed herein.

Method 300 begins with the requesting of data from a device by a processor (block 305). A shim, or interface unit, may be coupled in the communications path between the processor and the device. The shim may access the data from the device (block 310). The data may be accessed according to transfer parameters that are controlled or set by the device. The accessed data may then be stored in a receive FIFO of the shim (block 315). After a certain amount of data has been stored, the shim may send an interrupt to the processor indicating that it is ready to send the requested data (block 320). The processor may respond by accessing the data from the shim (block 325). Data may be transferred from the shim to the processor at transfer parameters set/controlled by the processor.

Figure 4:
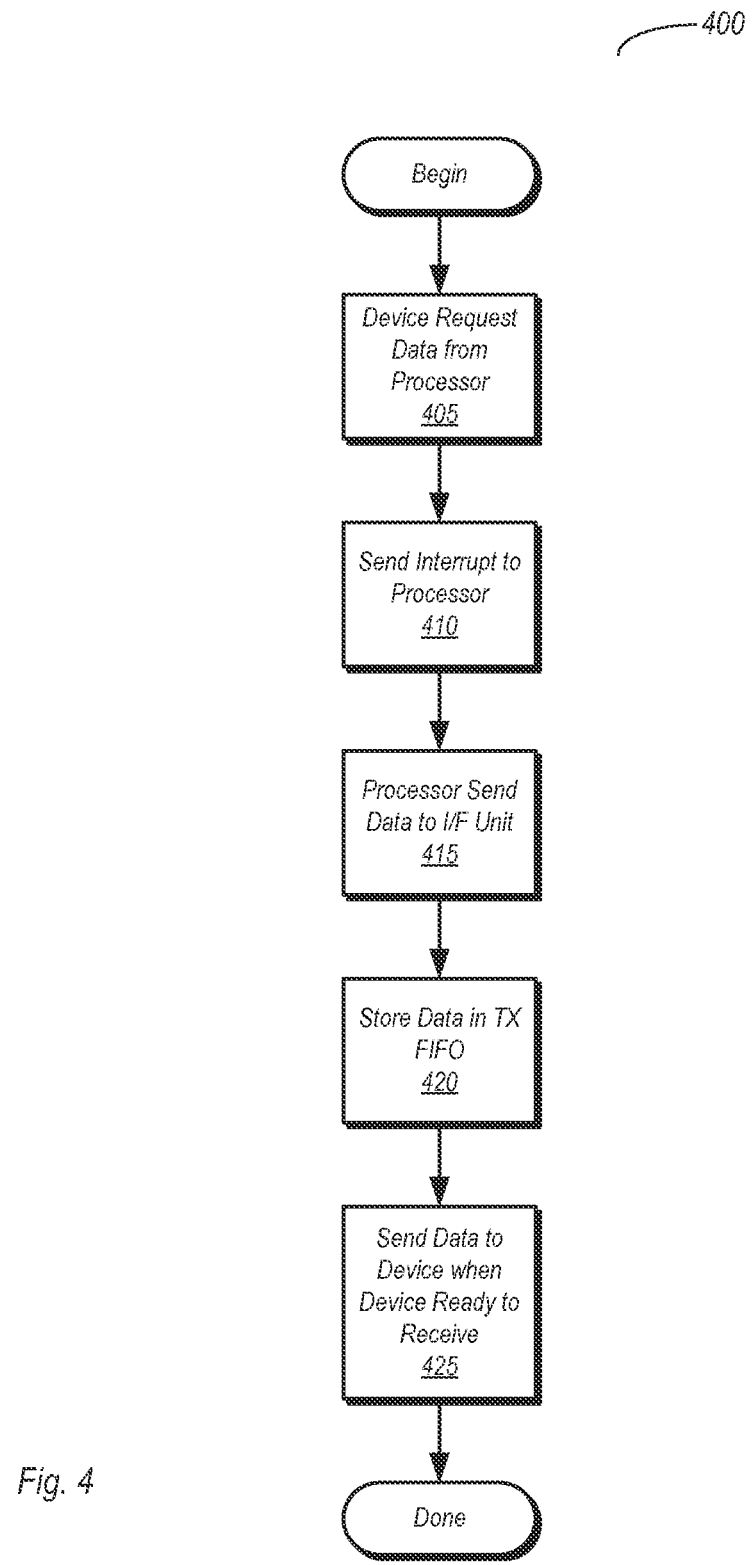
FIG. 4 is a flow diagram illustrating one embodiment of a method for transferring data from a processor to a device via an interface unit.

FIG. 4 is a flow diagram illustrating one embodiment of a method for transferring data from a processor to a device via an interface unit. As with method 300 discussed above, method 400 may be performed using various embodiments of the system 10 and/or shims 20 as described above, as well as on embodiments not explicitly discussed herein.

Method 400 begins with a device requesting data from a processor (block 405). As an alternative, the data to be transferred from the processor may be data generated in response to a previous processor request from the device. An interrupt may be sent to the processor (block 410) in order to indicate that the device is ready to receive data. The processor may respond by transferring data to the shim, or interface unit (block 415). The data may be transferred from the processor to the shim using data transfer parameters that are set/controlled by the processor. The data received by the shim may be stored in a transmit FIFO (block 420). The shim may transfer the data to the target device when it is ready to receive (block 425). The transfer of data from the shim to the target device may be performed using data transfer parameters set/controlled by the target device.

It is noted that the various hardware embodiments discussed above, as well as others not explicitly disclosed herein, may perform multiple, concurrent instances of methods 300 and 400. For example, a processor could initiate a first instance of method 300 through a given shim 20 and then initiate a second instance through the same shim 20 before the first instance has completed. Additional instances beyond the second could also be initiated. With respect to method 400, a device 17 could initiate a first instance thereof, followed by a second instance of that method being initiated by a second device 17. Moreover, multiple instances of each of method 300 and method 400, via a common shim 20, may be active at a given time. This may also be extended to multiple shims 20, as multiple shims 20 may each have one or more instances of method 300 and/or method 400 in progress at any given time. In another example, two instances of method 300 and two instances of method 400 may be concurrently performed through a first shim 20, while three instances of method 300 and three instances of method 400 may be concurrently performed through a second shim 20.

The ability to allow multiple instances of methods 300 and 400 to be concurrently performed may allow for more efficient utilization of the bandwidth of processors 12 and/or bus 11. In embodiments where processors 12 can send or receive data via bus 11 at data rates higher than one or more of the devices 17 can do the same, better bandwidth utilization of bus 11 and/or processors 12 may be obtained by having multiple overlapping transactions being performed, instead of waiting for a single transaction to complete before starting the next. In effect, the shims 20 may enable pipelining of transactions between processors 12 and a number of different devices 17, as well as pipelining transactions between the devices 17 and memory 14.

Figure 5:
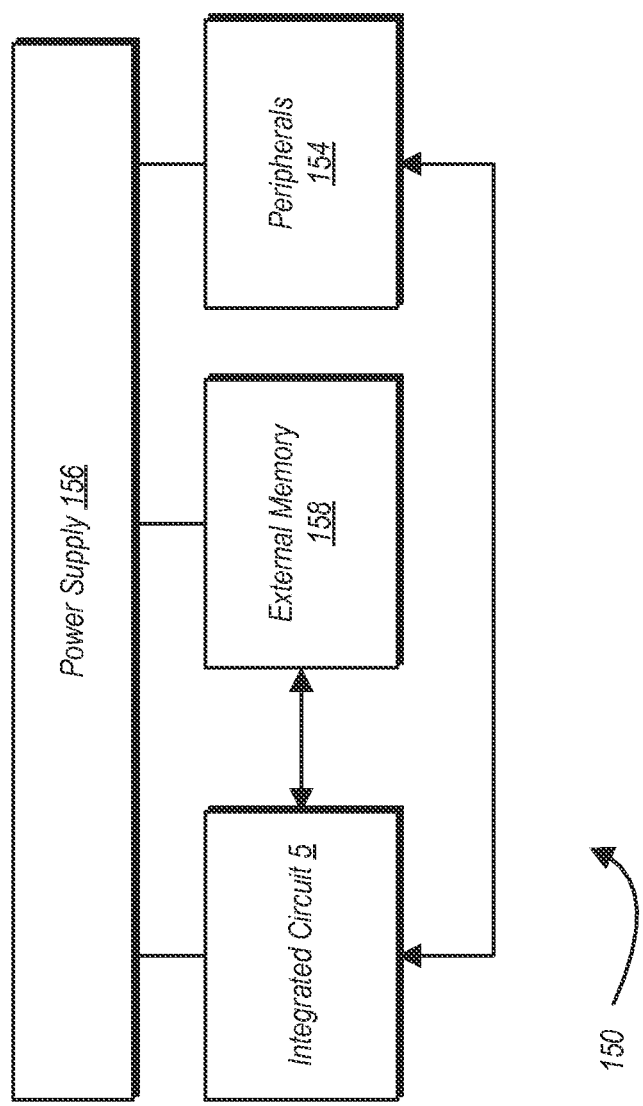
FIG. 5 is a block diagram of one embodiment of an exemplary system.

Turning next to FIG. 5, a block diagram of one embodiment of a system 150 is shown. In the illustrated embodiment, the system 150 includes at least one instance of the integrated circuit 5 coupled to external memory 158. The integrated circuit 5 is coupled to one or more peripherals 154 (which may correspond to one or more of devices 17) and the external memory 158. A power supply 156 is also provided which supplies the supply voltages to the integrated circuit 5 as well as one or more supply voltages to the memory 158 and/or the peripherals 154. In some embodiments, more than one instance of the integrated circuit 5 may be included (and more than one external memory 158 may be included as well).

The peripherals 154 may include any desired circuitry, depending on the type of system 150. Moreover, peripherals 154 may be equivalent, at least in some cases, to devices 17 discussed above. In one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a processor coupled to a first bus;
   one or more devices; and
   an interface unit coupled to the first bus and the one or more devices, the interface unit including a receive first-in first-out memory (FIFO), wherein the interface unit is configured to, responsive to a request from one of the one or more devices, read data from the one of the one or more devices and store the data in the receive FIFO, wherein the data is transferred into the receive FIFO over a second bus according to parameters controlled by the one of the one or more devices, the second bus being separate from the first bus and coupled directly between the interface unit and the one or more devices, wherein the interface unit is further configured to generate an interrupt to the processor subsequent to reading the data, wherein the interface unit includes a plurality of DMA (direct memory access) context registers each configured to store information for controlling data transfers between the processor and a selected one of the one or more devices, the stored information including an amount of data to be stored in the receive FIFO before triggering the interrupt, transaction identification information for transactions pending in the interface units, and data transfer parameters for the selected one of the one or more devices;
   wherein the processor is configured to access the data from the interface unit responsive to receiving the interrupt, wherein the data is transferred from the receive FIFO over the first bus according to parameters controlled by the processor, wherein the first bus is coupled directly between the processor and the interface unit.

2. The apparatus as recited in claim 1, wherein the interface unit further includes a transmit FIFO configured to store data received from the processor to be transmitted to one of the one or more devices.

3. The apparatus as recited in claim 2, wherein the interface unit includes a receive direct memory access (DMA) controller coupled to the receive FIFO and a transmit DMA controller coupled to the transmit FIFO.

4. The apparatus as recited in claim 3, wherein the receive DMA controller and the transmit DMA controller are coupled to bus interconnect unit, wherein the bus interconnect unit is coupled to the first bus.

5. The apparatus as recited in claim 2, wherein the interface unit is configured to receive data into the transmit FIFO according to a clock frequency and a data transfer width determined by the processor, and further configured to convey data to the one of the one or more devices according to a clock frequency and a data transfer width determined by the one of the one or more devices.

6. The apparatus as recited in claim 2, further comprising a bus bridge coupled to the second bus, wherein the one or more devices are coupled to the second bus.

7. The apparatus as recited in claim 6, further comprising an arbitration unit coupled to the bus bridge and further coupled to the transmit FIFO and the receive FIFO.

8. The apparatus as recited in claim 2, wherein the interface unit is configured to access data from the one of the one or more devices according to a clock frequency and a data transfer width determined by the one of the one or more devices, and wherein the processor is configured to access the data from the interface unit according to a clock frequency and a data transfer width determined by the processor.

9. The apparatus as recited in claim 2, further comprising a programmed input/output (PIO) controller, wherein the PIO controller is configured to cause data to be transferred between the interface unit and the processor according to a clock frequency and a data transfer width determined by the processor, and further configured to cause data to be transferred between the interface unit and a PIO device according to a clock frequency and a data transfer width determined by the PIO device.

10. A method comprising:
requesting data from one of one or more devices coupled to an interface unit, wherein said requesting comprises a processor sending a request to an interface unit;
accessing requested data from the one of one or more devices according to parameters set by the one of the one or more devices over a first bus, wherein accessing the requested data from the one of one or more devices includes transferring the requested data from the one of the one or more devices directly to the interface unit via the first bus;
storing the requested data in a receive first-in first-out memory (FIFO);
sending an interrupt to the processor responsive to storing the requested data;
storing, in a DMA (direct memory access) context register, information for controlling transfer of data between the processor and the one of the one or more devices, the stored information including an amount of data to be stored in the receive FIFO before triggering the interrupt, transaction identification information for transactions pending in the interface units, and data transfer parameters for the one of the plurality of peripheral devices; and
accessing, using the processor, the requested data from the FIFO responsive to receiving the interrupt in accordance with parameters set by the processor over a second bus separate from the first bus, wherein accessing the requested data from the FIFO includes transferring the requested data directly from the interface unit to the processor via the second bus.

11. The method as recited in claim 10, further comprising:
the interface unit accessing the requested data from the one of one or more devices according to a clock frequency and a data transfer width determined by the one of the one or more devices; and
the processor accessing the requested data from the interface unit according to a clock frequency and a data transfer width determined by the processor.

12. The method as recited in claim 10, further comprising:
transferring data from the processor to the interface unit according to a clock frequency and a data transfer width determined by the processor;
storing the data in a transmit FIFO of the interface unit; and
transferring the data from the transmit FIFO of the interface unit to the one of the one or more devices according to a clock frequency and a data transfer width determined by the one of the one or more devices.

13. The method as recited in claim 10, further comprising:
controlling transfers of data from one of the one or more devices to the processor using a receive direct memory access (DMA) controller; and
controlling transfers of data from the processor to the one of the one or more devices using a transmit DMA controller.

14. A system comprising:
at least one processor;
an interface unit coupled to the at least one processor by a first bus; and
a plurality of peripheral devices coupled to the interface unit by a second bus separate from the first bus;
wherein the interface unit includes a receive direct memory access (DMA) controller configured to convey data to the processor and a transmit DMA controller configured to convey data received from the processor, wherein functionality provided by each of the receive and transmit DMA controllers is implemented at least partially in software;
wherein the interface unit is configured to transfer data directly between the processor and the interface unit, exclusively over the first bus, according to data transfer parameters determined by the processor;
wherein the interface unit is configured to transfer data directly between the interface unit and a selected one of the plurality of peripheral devices, exclusively over the second bus, according to data transfer parameters determined by the selected one of the plurality of peripheral devices; and
wherein the interface unit includes a plurality of DMA context registers each configured to store information for controlling data transfers between the processor and the one of the plurality of peripheral devices, the stored information including an amount of data to be stored in the receive FIFO before triggering the interrupt, transaction identification information for transactions pending in the interface units, and data transfer parameters for the one of the plurality of peripheral devices.

15. The system as recited in claim 14, wherein the interface unit is configured to:
re-format data received from the selected one of the plurality of peripheral devices into a format suitable for transmission to the processor according to processor data transfer parameters; and
re-format data intended for transmission to the selected one of the plurality of peripheral devices into a format suitable for transmission to the selected one of the plurality of peripheral devices using data transfer parameters determined by the selected one of the plurality of peripheral devices.

16. The system as recited in claim 15, wherein the interface unit includes a receive FIFO coupled to the receive DMA controller and configured to store data transferred from one of the plurality of peripheral devices to the processor, and a transmit FIFO coupled to the transmit DMA controller and configured to store data transferred from the processor to one of the plurality of peripheral devices.

17. The system as recited in claim 15, wherein the interface unit further includes:
a bus bridge coupled to the second bus; and
an arbitration unit coupled between each of the transmit and receive FIFOs and the bus bridge, wherein the arbitration unit is configured to perform arbitration on transactions between the processor and the plurality of peripheral devices.

* * * * *